J. D. SIVILS.
AUTOMOBILE SIGNAL.
APPLICATION FILED JULY 18, 1917.

1,258,954.

Patented Mar. 12, 1918.

WITNESSES

INVENTOR
J. D. Sivils.
BY Victor J. Evans
ATTORNEY

UNITED STATES PATENT OFFICE.

JEFFERSON D. SIVILS, OF SACRAMENTO, CALIFORNIA.

AUTOMOBILE-SIGNAL.

1,258,954. Specification of Letters Patent. Patented Mar. 12, 1918.

Application filed July 18, 1917. Serial No. 181,364.

*To all whom it may concern:*

Be it known that I, JEFFERSON D. SIVILS, a citizen of the United States, residing at Sacramento, in the county of Sacramento and State of California, have invented new and useful Improvements in Automobile-Signals, of which the following is a specification.

This invention relates to signal devices and has especial relation to a signal adapted to be attached to a motor or other vehicle for indicating the intentions of the driver in regard to the direction of travel or the stopping of the vehicle.

The primary object of the invention is to provide a signal, which may be secured to a convenient part of the vehicle and operated by the driver with one hand, to display upon either side of the said vehicle a suitable signal, which will indicate to others the proposed change of course in advance of such change.

Specifically stated, the invention consists of a preferably tubular guiding and supporting member open at each end and slidably receiving therein the tubular shanks of oppositely extending cup like signals, the said shanks in turn receiving the cylindrical shanks of other distinguishing signals, which are adapted to be housed in the cups of the first mentioned signals, all of said signals being capable of independent sliding movement and being provided with operating handles located within convenient reach of the driver of the vehicle.

Figure 1:
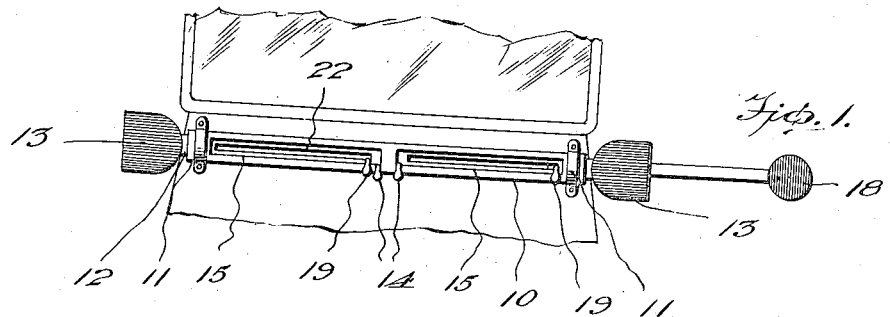
Figure 1 is an elevation of an improved signal applied to the upper edge of the instrument board of the motor vehicle, one of the signals being shown in extended position.
Figure 2:
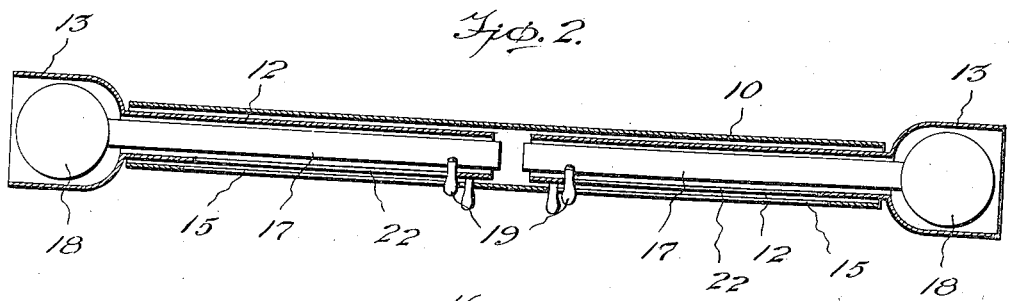
Fig. 2 is a longitudinal sectional view of the same.
Figure 3:
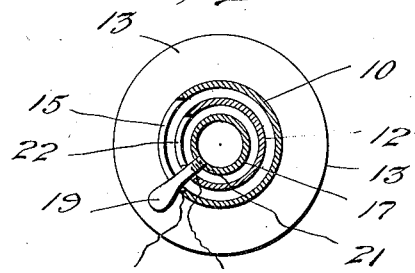
Fig. 3 is a transverse sectional view.
Figure 4:
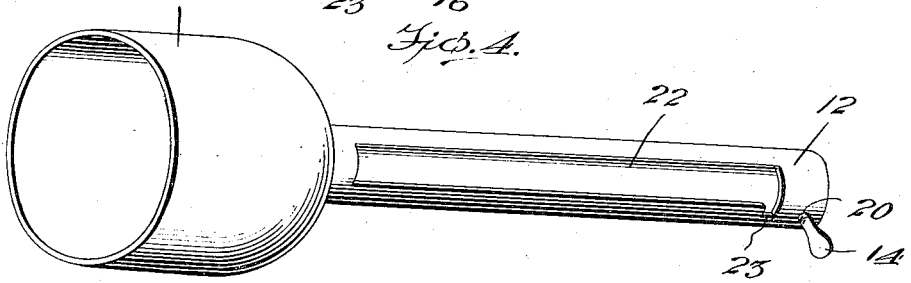
Fig. 4 is a detailed perspective view of the direction signal.
Figure 5:
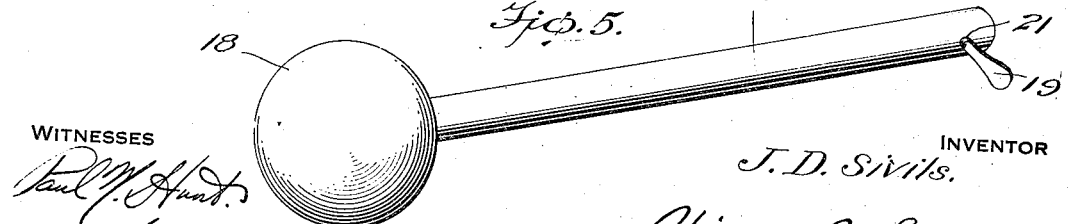
Fig. 5 is a similar view of the stop signal.

Referring to the drawings in detail, the invention comprises a tubular member or housing 10, which is adapted to be secured to any convenient part of a vehicle by any desired means, one of such means being indicated at 11 and comprising a strap located at each end of the member 10 and secured to the instrument board of the vehicle.

The member 10 is open at each end, and is adapted to receive the tubular shanks 12, of the direction signals 13, the said signals being preferably in the form of cups. The bases of the cups are secured to the outer ends of the shanks 12, so that the signals 13 will project laterally upon either side of the vehicle.

In order to operate the signals 13, they are each provided with laterally extending operating handles 14, the said handles being movable in slots 15 formed in the tubular body member 10, the inner ends of these slots being provided with communicating notches 16, in which are formed seats for the handles 14 to prevent accidental movement of the signals.

As stated the shanks 12 of the signals 13 are tubular in form, and are adapted to receive the cylindrical shanks 17, of stop signals 18, these latter signals being preferably in the form of a ball mounted upon the outer ends of the shanks 17. The signals 18 are preferably of a different color from the signals 13, for example, the latter signals may be blue and the former red, although the selection of these colors is not material. The shanks 17 of the signals 18 are provided with operating handles 19, these handles and the handles 14 being preferably removably secured within the openings 20 and 21 provided respectively in the shanks 12 and 17, the purpose being to permit of the ready removal and assembling of the various parts of the signal device for replacing the damaged or worn parts. The operating handle 19 is designed to move in a slot 22 provided in each of the shanks 12, these openings having communicating notches 23, similar to the notches 16 to hold the signal 18 in a retracted position.

Should the driver of the vehicle desire to turn to the left, the direction signal 13 upon the left hand side of the vehicle is operated by moving the same outwardly, the signal 13 upon the right hand side of the vehicle being operated in like manner should the driver desire to turn to the right. Should the driver wish to stop his vehicle, either of the signals 18 may be operated as would prove most convenient.

Having described the invention, what is claimed is:

A signal device comprising a hollow guiding and supporting member, a signal arm slidably mounted in each end thereof, a hollow signal located at the outer end of each of the signal arms, a second signal arm slidably mounted in each of the first mentioned arms and a signal carried by each of the second mentioned arms and adapted to be normally positioned within said hollow signal.

In testimony whereof I affix my signature.

JEFFERSON D. SIVILS.